C. KAMLAH
ATTACHMENTS FOR WASH-BOILERS.
No. 189,742. Patented April 17, 1877.
Fig. 1.
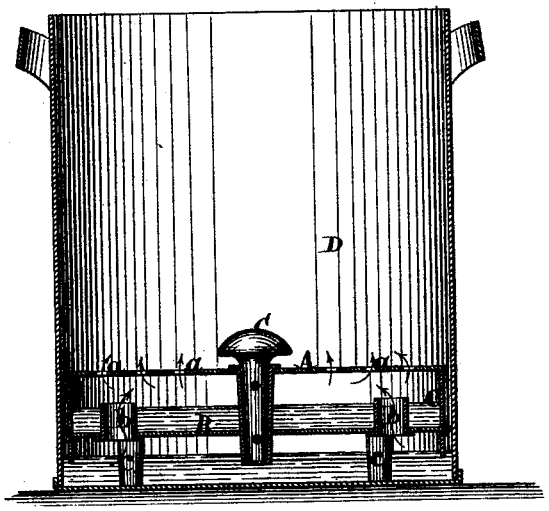
Fig. 2.  Fig. 3.
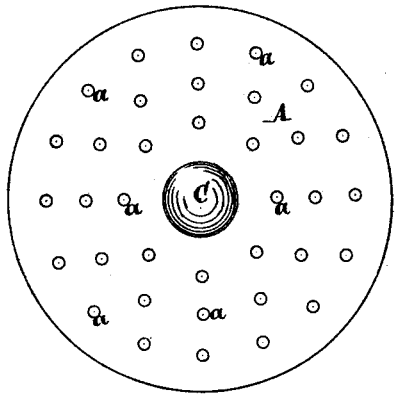 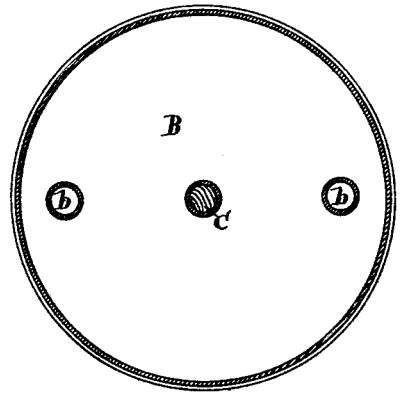
Witnesses.
Otto Hufeland
Hugo Brueggemann
Inventor.
Charles Kamlah
by
Van Santvoord & Hauff
his attorneys

UNITED STATES PATENT OFFICE.

CHARLES KAMLAH, OF JERSEY CITY HEIGHTS, NEW JERSEY.

IMPROVEMENT IN ATTACHMENTS FOR WASH-BOILERS.

Specification forming part of Letters Patent No. 189,742, dated April 17, 1877; application filed March 14, 1877.

*To all whom it may concern:*

Be it known that I, CHARLES KAMLAH, of Jersey City Heights, in the county of Hudson and State of New Jersey, have invented a new and useful Improvement in Wash-Boiler Attachments, which improvement is fully set forth in the following specification, reference being had to the accompanying drawing, in which—

Figure 1 represents a vertical section of a wash-boiler containing my improvement. Fig. 2 is a plan or top view of my improvement detached. Fig. 3 is a horizontal section of the same.

Similar letters indicate corresponding parts.

My improvement relates to an attachment to wash-boilers for cleaning and bleaching clothes by the combined action of steam and the vapors of benzine, turpentine, spirits of ammonia, or any other liquid or substance of a like nature. It consists in a pan made of a perforated top plate, a bottom plate which is provided with upwardly-projecting spouts, and of a solid rim, by which the two plates are united in such a manner that when the pan is placed in a wash-boiler, and water is poured in the latter in such quantity as to leave a space between the bottom of the pan and the surface of the water, while a mixture of benzine, or any similar liquid, and water is poured into the pan to the height of its spouts, and the boiler is placed over a fire, steam is generated beneath the pan, and serves to heat the latter, so that the liquid contained therein is caused to evaporate, while at the same time the steam passes up through the tubes, so as to commingle with the vapors, and the whole escapes through the perforated top plate of the pan and permeates the mass of clothes supported by said perforated top plate.

In the drawing, the letter A designates the top, and B the bottom, plate of my pan or attachment. C is the rim by which the said plates A and B are united. The top plate A is provided with numerous holes or perforations, *a*, while up from the bottom plate B project short spouts *b*. To the bottom plate B are soldered or otherwise secured feet *c*, for the pan to rest upon. The pan may be made round, oblong, or of any other appropriate shape, and of a size to correspond to the boiler in which it is to be placed. In order to permit of handling the pan without burning one's fingers, I provide the same with a handle, C, which is made of wood, or any other material which is a bad conductor of heat.

The pan is placed in a common wash-boiler, D, and a small quantity of water is poured into the latter, so as to leave a vacant space between the bottom plate B and the surface of the water. The pan is then also filled with water mixed with a very small quantity of benzine, turpentine, or spirits of ammonia, or any other similar liquid, to the height of the spouts *b*. The clothes are then thrown in the boiler, after having been well soaped, and the boiler is placed over a fire. Steam is thus generated from the water on the bottom of the boiler, and thereby the plate *b* becomes heated, and the liquid contained in the pan evaporates. The steam generated from the water on the bottom of the boiler passes up through the spouts *b*, and as the liquid evaporates from the pan such steam commingles therewith, and forces the combined steam and gases up through the perforated top plate A of the pan and through the clothes contained in the boiler, so as to loosen the dirt and bleach the clothes in a most effectual manner, the boiler being left uncovered, so that the steam and vapors, after having passed through the clothes, can escape freely.

It will be noticed that by my attachment the clothes are cleaned simply by a current of steam and gases passing up through them.

What I claim as new, and desire to secure by Letters Patent, is—

A removable pan or attachment for wash-boilers composed of the perforated top plate A, the bottom plate B, having upward-projecting spouts *b*, the rim C, and feet *c*, the whole being combined and adapted to operate substantially as described.

In testimony that I claim the foregoing I have hereunto set my hand and seal this 12th day of March, 1877.

CHS. KAMLAH. [L. S.]

Witnesses:
 W. HAUFF,
 E. F. KASTENHUBER.